May 4, 1926.
G. C. JETT
1,583,157
ADJUSTABLE SPROCKET MOUNTING
Filed Sept. 27, 1922
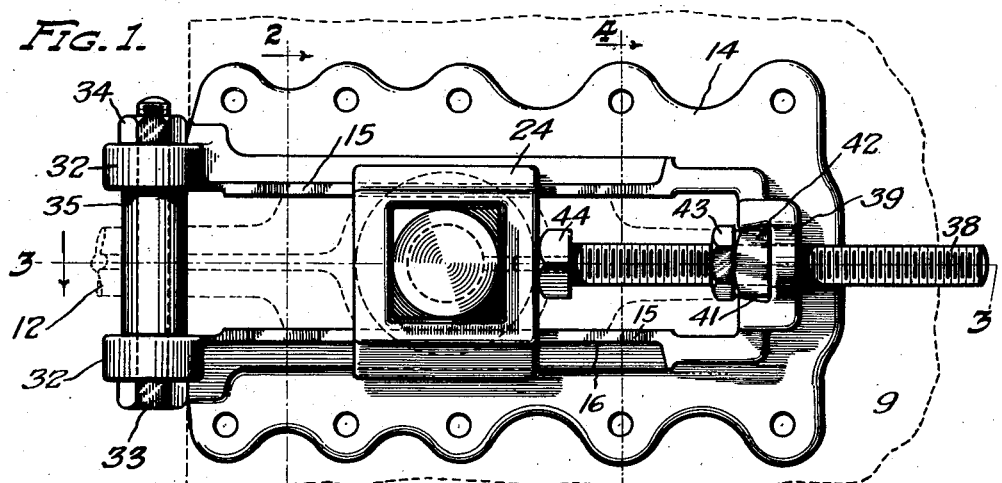
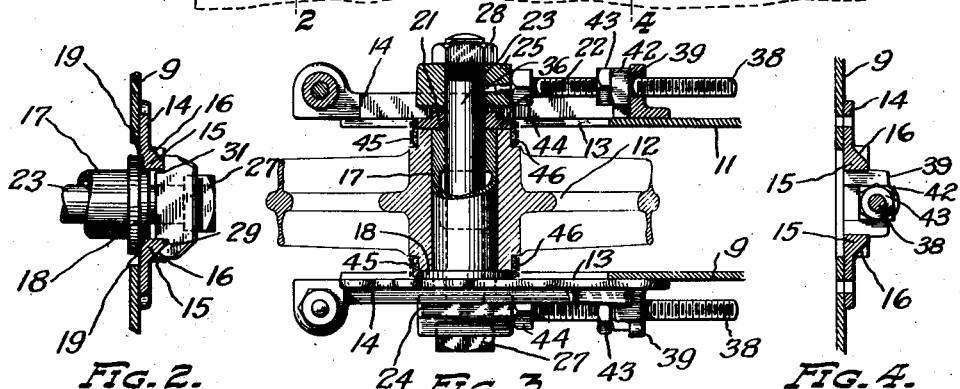
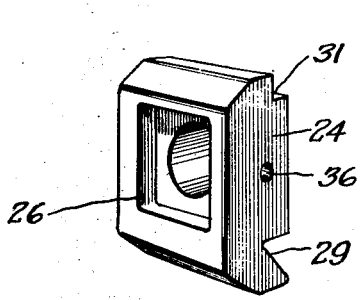
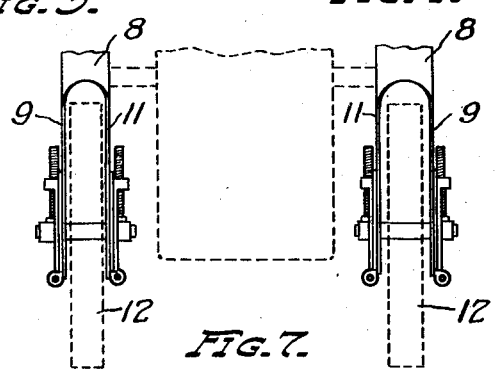
INVENTOR:
George C. Jett.
BY:
Ira K. Wilson
ATTORNEY.

Patented May 4, 1926.

1,583,157

UNITED STATES PATENT OFFICE.

GEORGE C. JETT, OF MILWAUKEE, WISCONSIN, ASSIGNOR OF TWO-FIFTHS TO WALTER H. STIEMKE, OF MILWAUKEE, WISCONSIN.

ADJUSTABLE SPROCKET MOUNTING.

Application filed September 27, 1922. Serial No. 590,849.

*To all whom it may concern:*

Be it known that I, GEORGE C. JETT, a citizen of the United States, residing at Milwaukee, in the county of Milwaukee and State of Wisconsin, have invented certain new and useful Improvements in Adjustable Sprocket Mountings, of which the following is a specification.

This invention relates in general to adjustable mountings for sprockets, pulleys and the like, wherein adjustment may be required for the purposes of taking up or slacking up on a chain or other flexible belt trained over the pulley or sprocket, and this invention is particularly adaptable for, and illustrated herein as applied to, the front creeper sprocket of an endless chain tread type of tractor, such, for instance, as is shown in my co-pending application, Serial No. 590,848, filed September 27, 1922.

One of the primary purposes of this invention is to provide a mounting of the character indicated which will be simple in construction, economical to manufacture, and which can be easily assembled and readily adjusted when required.

Another object is to provide a mounting which will rigidly clamp together the four limbs of the forked ways in which the wheel or sprocket is adjustably supported, thereby providing a strong, rigid and durable construction without the employment of excess material or the burden of excess weight.

A further purpose is to provide a mounting in which the bearing member for the pulley or sprocket also serves as one of the clamping members by which the structure is clamped together, thereby adding to the simplicity, economy and efficiency of the structure as a whole.

Other objects and many of the inherent advantages of this invention should be readily appreciated as the same becomes better understood by reference to the following description, when considered in connection with the accompanying drawings.

Referring to the drawings:

Fig. 1 is a side elevation of a mounting embodying a preferred form of my invention;

Fig. 2 is a fragmentary sectional view on the line 2—2 of Fig. 1;

Fig. 3 is a horizontal sectional view on the line 3—3 of Fig. 1;

Fig. 4 is a sectional view on the line 4—4 of Fig. 1;

Fig. 5 is a perspective view of one of the clamping blocks;

Fig. 6 is an enlarged view of one end of one of the adjusting screws; and

Fig. 7 is a fragmentary plan view of the forward end of a creeper tractor equipped with my invention.

Referring to the drawings more in detail, and particularly Fig. 7, reference characters 8 indicate generally the forward ends of the side frames of a creeper tractor mechanism, the side walls 9 and 11 of which side frames are spaced apart as shown and adapted to accommodate between them the forward creeper sprockets 12. This structure, however, is shown for illustrative purposes merely, as obviously the walls 9 and 11 may be a part of any machine or support upon which it is desirable to adjustably mount a sprocket, pulley or other machine element.

These walls or supports 9 and 11 are longitudinally slotted, as indicated at 13, and to the outer face of each there is fixedly secured by rivets or bolts a forked or U-shaped member 14 preferably of cast structure in the general shape of a longitudinally slotted plate. The longitudinal margins of the slot are thickened, providing opposed ribs 15 having parallel opposed faces and inclined outer faces 16, as will be apparent from Figs. 2 and 4.

Between these members 14 there is disposed a sleeve 17 which serves the dual function of a bearing for the wheel or sprocket 12 and a spacing element between the members 14. This sleeve is provided at one end, as will be apparent from Figs. 2 and 3, with an annular flange 18, the outer face of which is adapted to abut against the inner face of its opposed member 14, while that portion of the sleeve extending into the space between the ribs 15, is flattened at the top and bottom, as indicated at 19, for the purpose of holding the sleeve against rotary movements. At the opposite end of the sleeve 18 there is provided a disc 21 having a flanged end 22 similar to the flange 18 and also flattened at the top and bottom where it extends between the ribs 16 of the other forked plate 14. A bolt 23 extending through the sleeve and disc serves to retain the parts in asesmbled relation.

A pair of clamping blocks 24 and 25 are mounted upon the bolt 23 outside the members 14, and these blocks are substantially similar in structure and function, except that the block 24 is provided with a recess 26 adapted to receive the head 27 of the bolt 23, while the outer face of the block 25 presents a flat face to the nut 28 threaded upon a projecting end of the bolt 23.

Each block is provided on its inner face near the lower edge thereof with a groove 29 which is adapted to receive the lower rib 15, and while the upper end of the block may be similarly shaped, it is sufficient for most purposes that the upper end of the block be provided with a rectangular groove 31 adapted to receive the outer edge of the upper rib 15, as shown in Figs. 2 and 5.

When the parts thus far described are assembled, as shown in Fig. 3, and are securely clamped together by tightening of the nut 28, it will be apparent that upward thrust upon the wheel or sprocket 12 will be transmitted to both the upper and lower ribs of the forked plates 14, since the shoulder of the groove 31 will engage the lower face of the upper rib 15, while the inclined face of the groove 29 will embrace and be firmly clamped to the opposed inclined face 16 of the lower rib 15. The parts are, therefore, all rigidly clamped together to provide a strong, substantial and durable construction.

For the purpose of adding further rigidity to the construction, the forward projecting ends of the members 14 are provided with vertically aligned eyes 32 adapted to receive a clamping bolt 33 equipped with a clamping nut 34 and projecting between the eyes through a spacing member 35. When the nuts 34 are tightened up, the open ends of each fork member will obviously be rigidly clamped together.

In order that the bearing may be adjusted longitudinally of the slots to cause the pulley or sprocket 12 to exert the requisite tension upon the chain or belt trained thereover, each block 24 and 25 is provided on its rear face with a socket 36, adapted to accommodate a pin 37 projecting from the headed end of an adjusting screw 38, which extends loosely through an eye 39 formed on the outer end of the member 14. This eye is shaped to provide a socket 41 for the reception of a nut 42 threaded onto the screw 38 and a lock nut 43 cooperates with the nut 42 to lock the screw in adjusted position. When adjustment of the parts is desired, the nut 28 on the bolt 23 and the lock nuts 43 are loosened, whereupon the blocks 24 and 25 and the entire bearing structure carried thereby may be adjusted along the guideways by manipulation of a wrench applied to the heads 44 of the bolts 38.

In order to preclude the entrance of dust and dirt into the bearing from the sprocket 12, the ends of its hub are preferably surrounded by sealing or packing sleeves 45 retained in position by helical springs 46, the details of which construction are more fully disclosed in my prior Patent No. 1,383,466, issued July 5, 1921.

It will be apparent, therefore, that I have provided an adjustable mounting in which the various elements are all clamped and bound together so as to form a rigid, substantial and durable structure, and that the bearing may be adjusted by loosening the nut 28 and manipulating the adjusting screw 38 and may be quickly clamped in adjusted position by simply tightening the nut 28. The bearing sleeve upon which the wheel revolves, serves also as a spacing and clamping element, and the whole structure when assembled possesses the highly desirable qualities of strength and rigidity.

While I have shown and described that embodiment of my invention which at present appears preferable, it should be manifest that the details thereof may be varied within considerable limits without departing from the essence of the invention as defined in the following claims.

I claim:

1. In an adjustable sprocket mounting, the combination of a pair of bifurcated supporting members arranged in spaced relation, spacing means disposed between said members and providing a bearing for a sprocket wheel, and means including tongue and groove connections with the bifurcated members for clamping said members and spacing means rigidly together.

2. In an adjustable sprocket mounting, the combination of a pair of bifurcated members provided on their outer faces with ribs, spacing means disposed between said members, grooved blocks engaging the ribs on the outer faces of said members, and a clamping bolt extending through said block, members and spacing means whereby said elements are rigidly clamped together.

3. In an adjustable mounting, the combination of a pair of bifurcated supporting members provided with ribs presenting inclined faces, blocks engaging said ribs, a bolt passing through said blocks whereby the same may be clamped against said members, and spacing means disposed between the members.

4. In an adjustable mounting, the combination of a pair of bifurcated members each provided on its outer face with an outwardly projecting rib, a grooved block engaging each rib, spacing means disposed between said members, and means for rigidly clamping all of said elements together.

5. In an adjustable mounting, the combination of a plurality of slotted supporting members arranged in parallel spaced relation and provided on their outer faces adjacent the slots with outwardly extending inclined ribs, grooved blocks engaging said ribs, and means extending through said blocks whereby the blocks and said members are clamped together.

6. In an adjustable mounting, the combination of a plurality of slotted members arranged in parallel spaced relation and each provided on its outer face beneath said slot with an outwardly projecting inclined rib, a sleeve disposed between said members, a wheel rotatably mounted on said sleeve, a pair of blocks provided with grooves engaging said respective ribs, and a bolt extending through said sleeve, members and blocks whereby the same are rigidly clamped together so that upward thrust exerted on said bolt is transmitted through said grooved blocks to said ribs.

7. In an adjustable mounting, the combination of a pair of longitudinally slotted members, spacing means disposed between said members having flanges engaging the inner faces of the members and flattened projections extending into said slots whereby rotation of said means is prevented, blocks engaging the outer faces of said members, a clamping bolt for clamping all of said elements rigidly together, and means for adjusting said bolt and the elements carried thereby longitudinally of said slots.

8. In an adjustable mounting, the combination of a pair of bifurcated members provided on their outer faces adjacent said slots with outwardly extending inclined ribs, means for rigidly connecting the outer ends of the bifurcations of each member, spacing means disposed between said members, including a bearing sleeve and a disc, each provided with a circumferential flange and a flattened projection extending outwardly beyond said flange, blocks provided with grooves adapted to receive the ribs of their respective members, a clamping bolt extending through said sleeve, disc, members and blocks, and adjusting screws for operating between said members and said blocks whereby said blocks may be adjusted longitudinally of said slots.

9. In an adjustable mounting, the combination of a pair of bifurcated members, a wheel disposed between said members, and adjustable longitudinally of the bifurcated members, and means including clamping blocks for transmitting upward thrust of said wheel to the lower bifurcation of each member.

10. In an adjustable mounting, the combination of a bifurcated member provided with outwardly extending parallel ribs, means including a bolt and a spacing sleeve for rigidly connecting the free ends of said bifurcated member together, a grooved block disposed upon the outer face of said member and engaged with said ribs, means for adjusting said block longitudinally of said member, and means for clamping said block against said member in adjusted position.

GEORGE C. JETT.